United States Patent
Friedman et al.

(10) Patent No.: US 10,720,156 B2
(45) Date of Patent: Jul. 21, 2020

(54) CO-PILOT AND CONVERSATIONAL COMPANION

(71) Applicant: Toyota Motor Engineering & Manufacturing North America, Inc., Erlanger, KY (US)

(72) Inventors: Scott A. Friedman, Dallas, TX (US); Prince R. Remegio, Lewisville, TX (US); Tim Uwe Falkenmayer, Mountain View, CA (US); Roger Akira Kyle, Lewisville, TX (US); Ryoma Kakimi, Ann Arbor, MI (US); Luke D. Heide, Plymouth, MI (US); Nishikant Narayan Puranik, Frisco, TX (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 156 days.

(21) Appl. No.: 15/901,141

(22) Filed: Feb. 21, 2018

(65) Prior Publication Data
US 2019/0255995 A1    Aug. 22, 2019

(51) Int. Cl.
*G10L 15/22*    (2006.01)
*B60Q 9/00*    (2006.01)

(52) U.S. Cl.
CPC ............. *G10L 15/22* (2013.01); *B60Q 9/00* (2013.01)

(58) Field of Classification Search
CPC .................................................... G10L 15/22
See application file for complete search history.

(56) References Cited

U.S. PATENT DOCUMENTS

| | | | |
|---|---|---|---|
| 6,236,968 B1 | 5/2001 | Kanevsky et al. | |
| 2008/0235017 A1* | 9/2008 | Satomura | G10L 15/22 704/246 |
| 2010/0216509 A1* | 8/2010 | Riemer | H04M 1/72577 455/557 |
| 2012/0015686 A1* | 1/2012 | Krupnik | A63H 30/04 455/550.1 |

(Continued)

FOREIGN PATENT DOCUMENTS

WO    2012112300 A1    8/2012

OTHER PUBLICATIONS

NVIDIA, "Platforms", Retrieved from the Internet: <http://www.nvidia.com/object/ai-copilot.html>, Retrieved Sep. 27, 2017, 5 pages.

(Continued)

*Primary Examiner* — Douglas Godbold
(74) *Attorney, Agent, or Firm* — Christopher G. Darrow; Darrow Mustafa PC

(57) ABSTRACT

Methods and systems for communicating with a vehicle companion are disclosed. The vehicle companion can include receiving state information about an operator and environmental information about a vehicular environment. A cognitive load and a cognitive requirement can be determined using the state information and the environmental information, respectively. The cognitive load and the cognitive requirement are then compared to determine if an intervention indicator exists. The vehicle companion can then enter into conversation with the operator in response to the intervention indicator, including topics selected based on the operator's personality.

14 Claims, 4 Drawing Sheets

(56) References Cited

U.S. PATENT DOCUMENTS

| | | | |
|---|---|---|---|
| 2013/0275875 A1* | 10/2013 | Gruber | G10L 15/22 |
| | | | 715/728 |
| 2013/0275899 A1* | 10/2013 | Schubert | G06F 3/0481 |
| | | | 715/765 |
| 2013/0325482 A1* | 12/2013 | Tzirkel-Hancock | G10L 15/22 |
| | | | 704/275 |
| 2014/0032596 A1 | 1/2014 | Fish et al. | |
| 2014/0136187 A1 | 5/2014 | Wolverton et al. | |
| 2014/0309806 A1 | 10/2014 | Ricci | |
| 2015/0274180 A1* | 10/2015 | Prakah-Asante | H04W 8/22 |
| | | | 701/36 |
| 2015/0344040 A1* | 12/2015 | Heckmann | B60W 50/08 |
| | | | 701/1 |
| 2016/0104486 A1* | 4/2016 | Penilla | H04L 67/12 |
| | | | 704/232 |
| 2017/0162197 A1* | 6/2017 | Cohen | G06F 3/012 |
| 2017/0206064 A1 | 7/2017 | Breazeal et al. | |
| 2018/0204570 A1* | 7/2018 | Puranik | G10L 15/22 |
| 2018/0204572 A1* | 7/2018 | Manabe | G10L 15/22 |
| 2019/0202478 A1* | 7/2019 | Gruchalski | B60W 30/02 |

OTHER PUBLICATIONS

Ohnsman, "Toyota Envisions Next-Generation Cars as AI-Enabled Best Friends", Retrieved from the Internet: <https://www.forbes.com/sites/alanohnsman/2017/01/05/toyota-envisions-next-generation-cars-as-ai-enabled-best-friends/#18da85947188>, Retrieved Sep. 27, 2017, 4 pages.

Anderson et al., "Constraint-Based Planning and Control for Safe, Semi-Autonomous Operation of Vehicles", Intelligent Vehicles Symposium (IV), IEEE, Jun. 12, 2012, 6 pages.

* cited by examiner

CO-PILOT AND CONVERSATIONAL COMPANION

TECHNICAL FIELD

Embodiments described herein generally relate operator vehicle interaction. More specifically, embodiments generally relate to vehicle-initiated natural language conversations.

BACKGROUND

Operating or using a vehicle creates extended periods of low interaction for the driver or user. Most drivers are driving in their vehicles alone, with a lack of interactive communication or intellectual stimulation. Long commutes only exacerbate the problem, as lack of stimulation is combined with long stretches of monotonous activity. This problem doesn't go away in current autonomous vehicles, as the driver must remain vigilant and take control of the vehicle should the need arise.

The use of audio devices, such as radios or recorded audio has been used in the past. However, standard audio devices suffer in this aspect as they only provide sound to the driver or user. Devices such as smart phones and tablet computers have increasing capabilities, such as networking features, high definition video, touch interfaces, and applications. However, these devices are limited in their ability to engage the driver or user.

SUMMARY

The systems and methods described herein indirectly monitor cognitive load as part of a companion system for operator interaction with a vehicle. In another embodiment, a vehicle companion system for vehicle-to-user interaction, is disclosed. The system can include one or more processors and a memory communicably coupled to the one or more processors. The memory can store a cognitive monitoring module including instructions that when executed by the one or more processors cause the one or more processors to receive, using one or more internal sensors, state information about an operator, to receive, using one or more external sensors, environmental information about a vehicular environment, to determine a cognitive load of the operator using the state information, to determine a cognitive requirement of the vehicular environment using the environmental information, and to compare the cognitive load and the cognitive requirement to determine if an intervention indicator exists. The memory can further store a conversation module including instructions that when executed by the one or more processors cause the one or more processors to emit natural language speech via an audio output device in response to the intervention indicator, the natural language speech prompting a conversation with the operator, the conversation including a topic selected based on stored personality profile information.

In another embodiment, a non-transitory computer-readable medium for vehicle-to-user interaction is disclosed. The computer-readable medium can store instructions that when executed by one or more processors cause the one or more processors to receive, using one or more internal sensors, state information about an operator. The computer-readable medium can further store instructions to receive, using one or more external sensors, environmental information about a vehicular environment. The computer-readable medium can further store instructions to determining a cognitive load of the operator using the state information. The computer-readable medium can further store instructions to determining a cognitive requirement of the vehicular environment using the environmental information. The computer-readable medium can further store instructions to comparing the cognitive load and the cognitive requirement to determine if an intervention indicator exists. The computer-readable medium can further store instructions to emitting natural language speech via an audio output device in response to the intervention indicator, the natural language speech prompting a conversation with the operator, the conversation including a topic selected based on stored personality profile information.

In another embodiment, a method for vehicle-to-user interaction is disclosed. The method can include receiving, using one or more internal sensors, state information about an operator. The method can further include receiving, using one or more external sensors, environmental information about a vehicular environment. The method can further include determining a cognitive load of the operator using the state information. The method can further include determining a cognitive requirement of the vehicular environment using the environmental information. The method can further include comparing the cognitive load and the cognitive requirement to determine if an intervention indicator exists. The method can further include emitting natural language speech via an audio output device in response to the intervention indicator, the natural language speech prompting a conversation with the operator, the conversation including a topic selected based on stored personality profile information.

BRIEF DESCRIPTION OF THE DRAWINGS

So that the manner in which the above recited features of the present disclosure can be understood in detail, a more particular description of the disclosure, briefly summarized above, may be had by reference to the embodiments, some of which are illustrated in the appended drawings. It is to be noted, however, that the appended drawings illustrate only typical embodiments of this disclosure and are therefore not to be considered limiting of its scope. The disclosure may admit to other equally effective embodiments.

To facilitate understanding, identical reference numerals have been used, wherever possible, to designate identical elements that are common to the Figures. Additionally, elements of one embodiment may be advantageously adapted for utilization in other embodiments described herein.

DETAILED DESCRIPTION

A vehicle can be equipped with various technologies, including voice recognition, artificial intelligence, and/or machine learning. The vehicle can include a vehicle companion system, which can include one or more voice input receivers (e.g., microphones). The vehicle companion system can include any suitable voice recognition technology, now known or later developed, that can analyze received voice inputs from a user in the vehicle.

The vehicle can include an agent on one or more processors of the vehicle and/or on a portable communication device of the user. The agent can be configured to converse with the user as a co-pilot or companion. The agent can leverage natural language generation (NLG) to have polite and intellectual conversations on demand or when necessary. The agent, as presented through the systems and methods described herein, use cognitive load ranges to determine if the operator can benefit from conversation. Cognitive load, as used herein, refers to a measure of the mental effort being exerted by the operator. The agent can then enter into conversation with the driver, as described herein.

An operator can be operating the vehicle with an intervention indicator. An intervention indicator is a measurement indicating the cognitive load being outside of cognitive load range, such as a low cognitive load. In one embodiment, if a user is operating the vehicle with an intervention indicator and if the user indicates that he or she is bored, the system can initiate a conversation with the user to keep the operator awake. Any topic can be selected for the conversation, such as news, general knowledge, etc. The system can also take into account user references when selecting a topic. The agent can help to minimize or eliminate awkward silence during a trip if warranted. The agent can keep the user engaged in driving by providing stimulating conversation while driving. The interaction with the agent can build a user's trust with and confidence in the agent. Elements of the embodiments disclosed herein are more clearly described with relation to the figures below.

Figure 1:
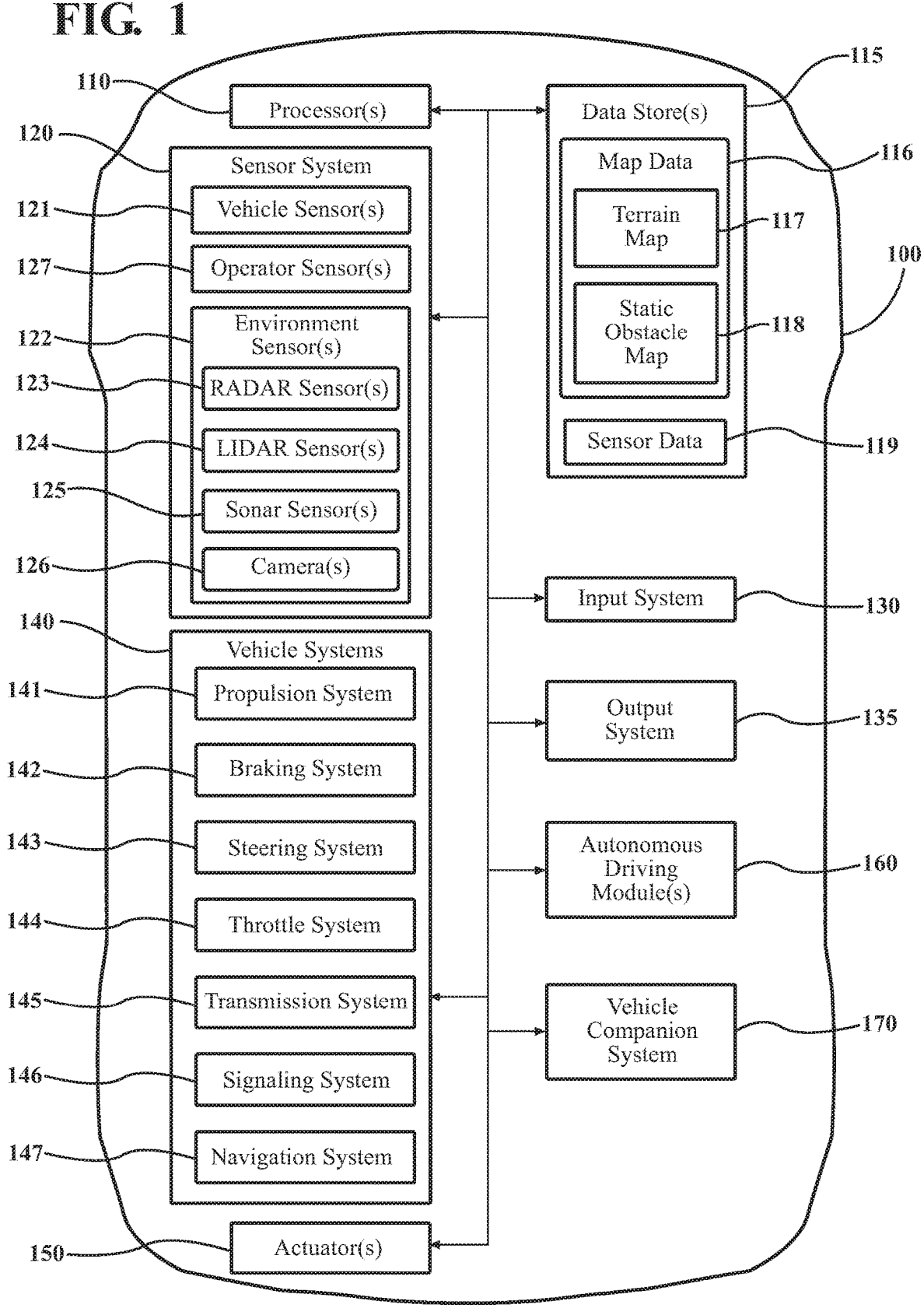
FIG. 1 is a block diagram of a vehicle incorporating a vehicle companion system, according to embodiments described herein.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, can operate at least semi-autonomously, includes an augmented reality (AR) system or capabilities to support an AR system, and thus benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100 and vice versa. As well, the sensors of the vehicle 100 can be referred to as internal sensors or external sensors. However, internal and external can refer to the source of information or the location of the object, and are not limiting of the location unless specifically stated. Thus, in further embodiments, an internal sensor or an external sensor can collect information on an external environment, an internal environment or both. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-4 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those having ordinary skill in the art, however, will understand that the embodiments described herein may be practiced using various combinations of these elements.

The vehicle 100 further includes a vehicle companion system 170 that is implemented to perform methods and other functions as disclosed herein relating to natural language and unprompted communication between the vehicle and the operator. The vehicle companion system 170 can include a number of modules configured with instructions to perform the variety of functions listed below. In one example, the vehicle 100 is equipped with the vehicle companion system 170, including personality profile module for collecting personality information about an operator, a cognitive monitoring module having instructions to determine or anticipate cognitive load of the operator, and a conversation module having instructions to enter into conversation with the operator based on operator interests. The other modules or systems described herein can be in communication with all or a part of the vehicle companion system 170.

Figure 2:
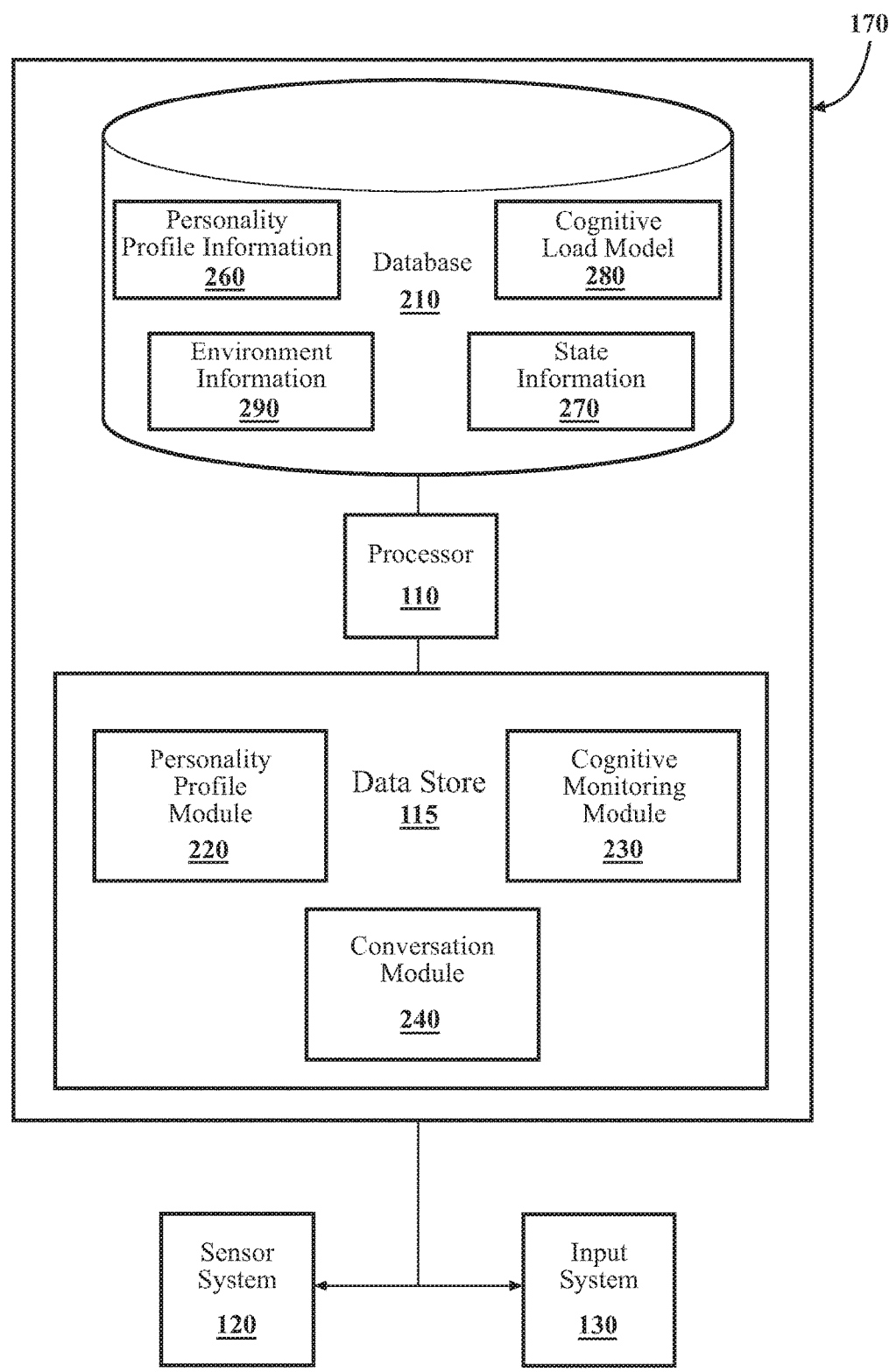
FIG. 2 is an illustration of a vehicle companion system for operator interactions, according to embodiments described herein.

With reference to FIG. 2, one embodiment of the vehicle companion system 170 is further illustrated. The vehicle companion system 170 is shown as including a processor 110 from the vehicle 100 of FIG. 1. Accordingly, the processor 110 can be a part of the vehicle companion system 170, the vehicle companion system 170 can include a separate processor from the processor 110 of the vehicle 100, or the vehicle companion system 170 can access the processor 110 through a data bus or another communication path. In one embodiment, vehicle companion system 170 includes a data store 115 that can store a personality profile module 220, a cognitive monitoring module 230, and a conversation module 240. The data store 115, as described in FIG. 1, can be a random-access memory (RAM), read-only memory (ROM), a hard-disk drive, a flash memory, or other suitable memory for storing the modules 220, 230, and 240. The modules 220, 230, and 240 are, for example, computer-readable instructions that when executed by the processor 110, cause the processor 110 to perform the various functions disclosed herein.

The vehicle companion system 170 can begin with instructions from the personality profile module 220. The personality profile module 220 is an optional module which generally includes instructions that function to control the processor 110 to retrieve data from one or more operator sensors 127 of the sensor system 120 of the vehicle 100. In one embodiment, the personality profile module 220 includes instructions to acquire personality profile information 260 that characterizes the interests of the operator, the knowledge base of the operator, personality of the operator, and so on. It should be appreciated that the present disclosure provides an exemplary listing of aspects associated with the operator that can be monitored to produce the state information 270. However, this listing is not to be construed as limiting and is provided as an exemplary list of possibilities for purposes of this discussion.

The personality profile module 220 can receive input regarding the operator's personality, likes, needs and interests from a variety of sources. In one embodiment, the personality profile module 220 can include one or more operator sensors 127, such as a microphone and an image capture device. The one or more operator sensors 127 can collect audio information from the interior of the vehicle, such as from the operator. Audio information can include verbalized information from the operator or other users, including statements of like or dislike (e.g., "I hate having to listen to this radio host every morning!" or "Are we having Indian for lunch? Sounds great!"). The personality profile module 220 can collect visual information to inform the system on operator personality. Visual information can include information based on gestures and facial movements, when presented with topics. The personality profile module 220 can further collect information from remote sources, such as a remote database of information regarding the operator. Further, the personality profile module 220 can collect information from stored sources, such as e-mail, social media profiles, advertiser profiles, individually provided data (e.g., data from a questionnaire) or from other data sources, as may be made available.

The personality profile module 220 can then store the input received from the various sensors and other sources as part of the personality profile information 260. The personality profile information 260 is a collection of information regarding the operator's personality, likes, needs and interests, such as driving preferences, hobbies, personal interests, political interests, moods and emotional triggers, group involvements, planned events, social engagements, and others information which describes or influences the operator's personality. The personality profile information 260 can be stored in a database, such as a database 210.

With continued reference to the vehicle companion system 170, in one embodiment, the vehicle companion system 170 can include the database 210. The database 210 can be stored in the data store 115. The database 210 is, in one embodiment, an electronic data structure stored in the data store 115 or another data store and that is configured with routines that can be executed by the processor 110 for analyzing stored data, providing stored data, organizing stored data, and so on. Thus, in one embodiment, the database 210 stores data used by the modules 220, 230, and 240 in executing various functions. In one embodiment, the database 210 includes personality profile information 260 collected by the personality profile module 220. In another embodiment, the database 210 can include further information created by the cognitive monitoring module 230 or the conversation module 240 using, in part, the personality profile information 260.

The cognitive monitoring module 230 generally includes instructions that function to control the processor 110 to receive data from sensors of a sensor system 120 of the vehicle 100. In other words, the cognitive monitoring module 230 includes instructions to acquire state information 270. In one embodiment, the cognitive monitoring module 230 receives, using one or more sensors, state information about an operator and environmental information about a vehicular environment, to determine a cognitive load of the operator using the state information. The state information 270 is information which indicates the alertness of the driver, which includes information that characterizes a present mental state of the operator, a present cognitive load of the operator, anticipated cognitive load of the operator, biological responses/conditions of the operator, and so on. The cognitive monitoring module 230 can then store the state information 270 in a data store, such as the database 210. It should be appreciated that the present disclosure provides an exemplary listing of aspects associated with the operator that can be monitored to produce the state information 270. However, this listing is not to be construed as limiting and is provided as an exemplary list of possibilities for purposes of this discussion.

Accordingly, by way of example, the state information 270 can include information about the cognitive load of an operator, such as information about an event statement made by the operator. In one embodiment, the event statement is a constative utterance related to decreased cognitive load. In one example, the event statement is a comment expressing a state of tiredness, such as "I can barely keep my eyes open!" The event statement may be unprompted, such as an exclamation or statement from the operator, without system input. In another embodiment, the state information 270 can include information about an actual or anticipated decrease in cognitive load, such as predictive vigilance information about the operator. The predictive vigilance information about the operator include information which indicates the operator's predicted attention, alertness, or awareness in a driving environment, including average level of focus over time, average biometric readings over time in the driving environment, average timing before issuing an event statement, response time for autonomous take-over indicators, or other factors indicating the length of time and circumstances for decreased cognitive load. In one embodiment, the predictive vigilance information can include information about current cognitive load and past cognitive load of the operator. Average level of focus over time can include averages of a direction of a gaze, a path/track of the gaze. The average biometric readings over time in the driving environment can include averages of heart rate, blood pressure, respiratory function, blood oxygen levels, perspiration levels, pupil dilation/size, brain activity (e.g., EEG data) or combinations thereof.

In one or more embodiments, the cognitive monitoring module 230 can use environmental information 290 from one or more sensors, such as the sensor system 120, to determine the cognitive requirements of the vehicle environment. The environmental information 290 is information which provides one or more indicators regarding the shape, spacing or nature of the environment around the vehicle or components (e.g., objects) therein. The environmental information 290 can be stored as part of a data store, such as environmental information 290 stored in the database 210. The cognitive requirements of the vehicle environment can include a measure of the attention, alertness, or awareness that the vehicle companion system 170 desires from the operator for vehicle operation within an environment, such as the minimum vigilance for safe vehicle operation. In another embodiment, the cognitive monitoring module 230 determines a cognitive requirement of the vehicular environment using the environmental information, and compares the cognitive load and the cognitive requirement to determine if an intervention indicator exists.

The cognitive requirements of an environment can include challenge information about the vehicular environment. Challenge information about a vehicular environment is information related to the level of difficulty of a vehicular environment. The vehicle companion system 170 anticipates that the more challenging a driving environment is, the more an operator will have to concentrate (e.g., higher cognitive load). More concentration is interpreted by the vehicle companion system 170 as reducing the likelihood of falling asleep. Conversely, the less challenging an environment is, the less an operator will have to concentrate (e.g., lower cognitive load and higher likelihood of falling asleep). As such, one or more features are selected about the vehicular environment, using the cognitive load model 280, to create a challenge rating. The challenge rating can be considered alongside the engagement rating to determine a cognitive load. The cognitive load can be calculated over time to determine decreased cognitive load, where decreased cognitive load events are determined over a period of time to allow for anticipation of decreased cognitive load for the operator. The anticipated decreased cognitive load can be based on time of driving, type of operation (e.g., manual or autonomous), types of road, frequency of road anomalies (e.g., bumps and holes), or other factors which might provide indication of decreased cognitive load when analyzed over time. One skilled in the art will understand the breadth of the available permutations of anticipated decreased cognitive load, based on the above disclosure.

Additionally, the cognitive monitoring module 230 can determine the state information 270 in multiple different ways depending on a particular implementation. In one embodiment, the cognitive monitoring module 230 communicates with various sensors of a sensor system 120 including one or more of environment sensors 122 for collecting information about the vehicular environment and one or more of operator sensors 127 for collecting information about the operator. The environment sensors 122 can include RADAR sensors 123, LIDAR sensors 124, sonar sensors 125, camera(s) 126 and others useful for collecting information about a vehicle environment. The operator sensors 127 can include cameras (e.g., for gaze/eye tracking), microphone(s), heart rate monitor sensors, infrared sensors, seat position sensors, and so on. In one embodiment, the operator sensors 127 are located within a passenger compartment of the vehicle 100 and can be positioned in various locations in order to acquire information about the noted aspects of the operator and/or aspects related to the operator. Furthermore, the sensor system 120 can include multiple redundant ones of the vehicle sensors 121 and the operator sensors 127 in order to, for example, improve accuracy/precision of collected state information 270.

The cognitive monitoring module 230 can then compare the cognitive load of the operator to the cognitive requirements of the vehicular environment. The cognitive load can be numerically represented in light of a maximum and minimum cognitive load for a particular operator. The cognitive load can be a weighted measurement of all factors measured regarding the operator. In one example, the cognitive load is represented as a fraction between an arbitrary maximum cognitive load and a minimum cognitive load indicating sleep. The cognitive requirement can be a specific value, such as a value that indicates a transition point between acceptable cognitive load values and unacceptable cognitive load values. Further, the cognitive requirement can be a range of values, such as a range of unacceptable cognitive load values which indicate a danger of falling asleep. The cognitive monitoring module 230 can then determine if there is an intervention indicator, if the cognitive load is determined at or below an unacceptable cognitive load value.

The conversation module 240 generally includes instructions that function to control the processor 110 to emit natural language speech via an audio output device in response to the intervention indicator, the natural language speech prompting a conversation with the operator, the conversation including a topic selected based on stored personality profile information. Natural language speech is synthesized speech which mimics the form, fluidity, articulation, speed and other factors related to natural human speech. The vehicle companion system 170 responds with natural language speech, when the conversation module 240 determines that there is an intervention indicator from the operator. The response from the conversation module can be based on the personality of the operator. The personality of the operator can be available from the personality profile information 260 stored in the database 210. The natural language speech can be in a variety of languages, as desired by the operator. The natural language speech can be initiated without interaction from the operator. Further, the natural language speech can be initiated in light of previous response to interactions, such as a determination that the operator would rather not interact under one or more circumstances. The topic selected can be based on the operator interests, such as favorite sports teams or subjects of interest.

The conversation module 240 can be configured to initiate a conversation with the operator. The conversation module 240 can pick and or present topics such that the operator is enticed to converse with the vehicle companion system 170. The conversation module 240 can then continue discussing the topic of choice or allow the operator to direct the conversation. When the operator is directing the conversation, the conversation module 240 can reference topics as necessary to continue the conversation with the operator. If the operator does not properly response to the conversation, the conversation module 240 can provide additional prompts to determine if the operator is alert and capable of response, such as asking "are you OK?" If the operator fails to respond, the conversation module 240 can provide one or more follow up responses, such as use one or more sensors to verify the state of the operator, pull the vehicle over to road side and stop autonomously, continue driving autonomously, contact police or medical personnel, or others.

In cases where an anticipated cognitive load is used, the conversation module 240 can determine that a conversation is desired to avoid an intervention indicator. As such, the conversation module 240 can enter into conversation as described above, with the goal of preventing cognitive load from falling below a certain level. In this case, the current cognitive load is not considered in initiating the conversation. In further embodiments, the cognitive requirement can be anticipated or otherwise determined before the environment is within range of the environment sensors 122, such as remotely determined vehicular environments or determinations based on similar vehicular environments. The conversation module 240 can plan for anticipated cognitive requirements by initiating conversation before the environment has been reached. Other and further combinations of anticipated cognitive load and anticipated cognitive requirement are contemplated.

As such, the vehicle companion system 170 can provide numerous benefits to an operator. The vehicle companion system 170, as described here, learns about the operator, determines levels of cognitive load and applies said cognitive load to your current situation based on the cognitive requirement of your vehicular environment. In doing this, the vehicle companion system 170 can help prevent decline in alertness and offer stimulating information to the operator at the same time.

Figure 3:
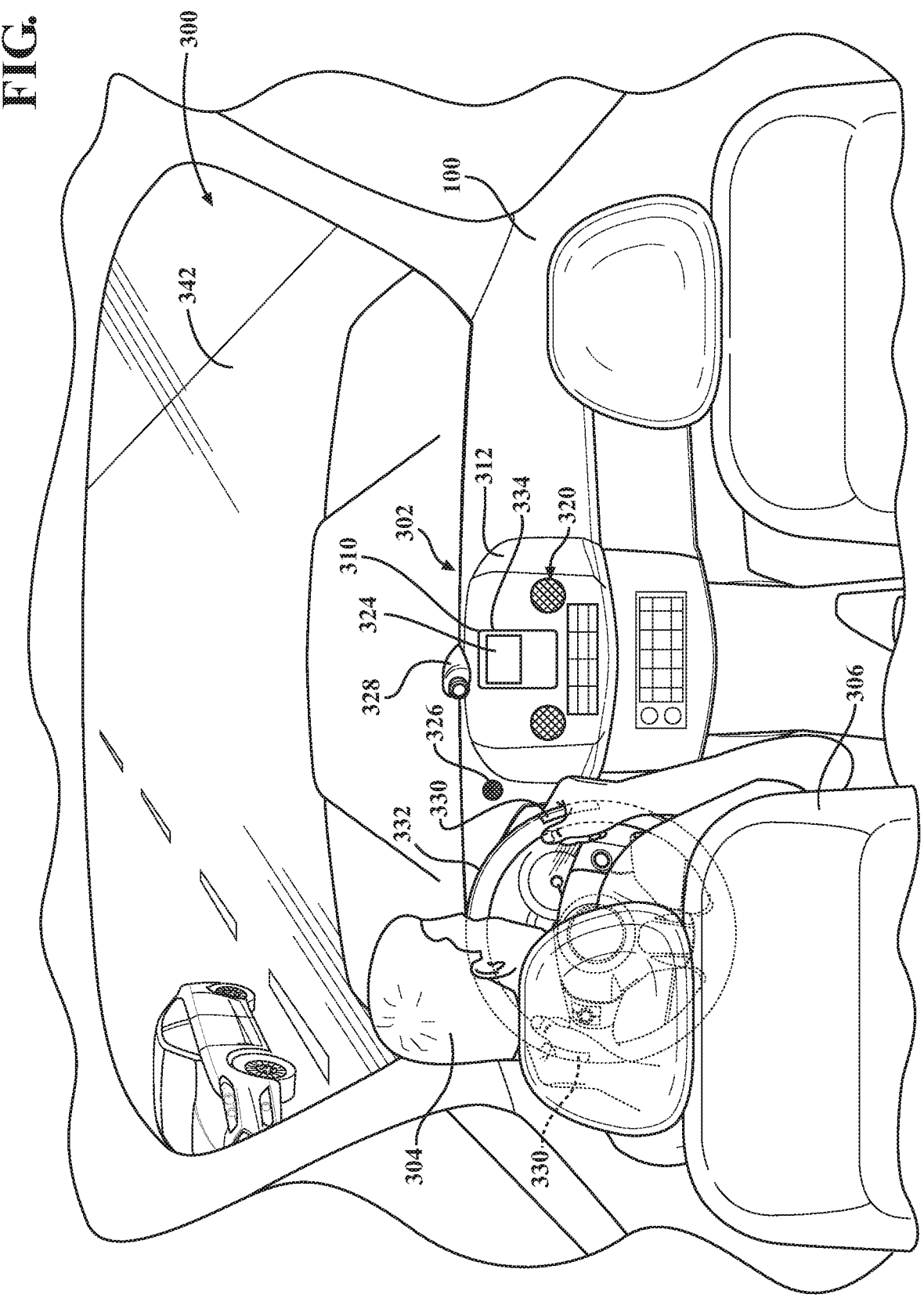
FIG. 3 is a schematic illustration of a vehicle interior incorporating elements of the vehicle companion system of FIG. 2.

FIG. 3 depicts an interior 300 of a vehicle 100 with a vehicle companion system 170, according to embodiments described herein. The vehicle companion system 170 can have an interface 310. The interface 310 can be either permanently integrated or portable. In this embodiment, the interface 310 is shown as portable. The interface 310 can incorporate the vehicle companion system 170, including the module 220, 230 and 240, described with reference to FIGS. 1 and 2. The interface 310 can be used in a number of different ways, some example scenarios of which are discussed below for illustrative purposes.

Referring now to FIG. 3, the interface 310 is shown positioned in the dashboard 302. An operator 304 is situated in the operator's seat 306 of the illustrative vehicle 104. Some features of the exemplary interface 310 shown in FIG. 3 are incorporated into existing components of the vehicle 100, although this need not be the case. For example, speakers 320 and a display screen 324 are installed in a vehicle dashboard 302, a mobile device syncing/docking area 334 (which may include a hard-wired communication port) is defined in a center console 312. The center console 312 also includes a microphone 326 and a camera 328. The vehicle 100 has a variety of biometric devices, such as a heart rate monitor 330 integrated into the steering wheel 332.

The personality profile module 220 of vehicle companion system 170 begins by capturing information about the operator 304. The operator 304 may indicate one or more interests, such as a love for chili cheese fries during a phone conversation using microphone 326, his support for his favorite basketball team, and family time scheduled for a specific time of day. As well, the vehicle companion system 170 collects information on physical data, such as biometrics using eye scanning, facial monitoring and others through the camera 328, and monitoring his heart rate through the heart rate monitor 330. These interests and more are then collected by the personality profile module 220 and stored in a database as personality profile information, such as in the personality profile information 260 located in the database 210, as described above with reference to FIG. 2. Further, the personality profile module 220 can connect to a network to collect information from other sources about the operator, such as through e-mail, social media or others.

The cognitive monitoring module 230 collects information regarding the cognitive load of the operator 304 and the cognitive requirement of the environment 340. Regarding the cognitive load of the operator 304, the cognitive monitoring module 230 collects information regarding the parameters described above with reference to FIG. 2, including statements from the operator 304, changes in biometrics, changes in eye position or facial tone, or others. The information collected can then be stored as state information, such as the state information 270 stored in the database 210, described with reference to FIG. 2. The cognitive monitoring module 230 collects the state information over a period of time regarding the operator 304. The state information can then be used to determine the minimum and maximums for cognitive load for the operator 304.

Regarding the cognitive requirement of the environment 340, the cognitive monitoring module 230 collects data from the environment using one or more sensors, such as the environment sensors 122 of the vehicle 100, described with reference to FIG. 1. The sensors include data regarding the position of the road, any obstacles, visibility, distance, number of other vehicles, length of the commute anticipated for the operator 304, and other factors likely to indicate the cognitive requirement for the environment 340. The cognitive monitoring module 230 then references the cognitive load model 280 to apply values to one or more of the factors determined about the environment 340. The cognitive load model 280 can include values for distance traveled and planned, three dimensional curvature of the road, weather conditions, terrain, status of the vehicle (e.g., autonomous or manual) and others which may influence the desired cognitive load range.

As the operator continues on the road 342, the cognitive monitoring module 230 can be continuously monitoring the operator 304. In one example, the operator 304 experiences a decrease in cognitive load, as determined by change in gaze, change in face position, heart rate and statement from the operator 304, "Wow, this road is so long!" The cognitive monitoring module 230 interprets these factors to determine that the operator 304 has a cognitive load below the cognitive requirement for the environment 340. The conversation module 240 then, through instructions executed by a processor, such as processor 110, begins a natural language conversation with the operator 304.

The conversation module 240 first references the personality profile information to determine the favorite sports team of the operator 304. Then the conversation module 240 connects with a network to learn one or more recent facts about the favorite sports team, before emitting "Did you hear about Sports Team's recent win over Rival Team?" using the speakers 320. Operator 304 responds, "That game was on tonight? What happened?" The response from the operator 304 can then be received by the conversation module 240 through the microphone 326. The conversation module 240 confirms the changes in cognitive load of the operator, using the microphone 326, the camera 328 and the heart rate monitor 330, determining that conversation can continue as long as needed and the operator 304 is no longer below the determined cognitive requirement.

Thus, the vehicle companion system 170, described above, can provide numerous benefits to the operator. Using the vehicle companion system 170, the operator 304 can remain awake and alert during an intervention indicator commute. Thus, the system described above allows for safer operation of a vehicle for longer periods of time. Further, these benefits can be transferred between autonomous vehicles and manual vehicles, allowing the operator to remain vigilant for requests from an autonomous vehicle. Finally, this system helps the operator catch up on the day's events or other topics of interests during the commute, which helps the operator save time.

Figure 4:
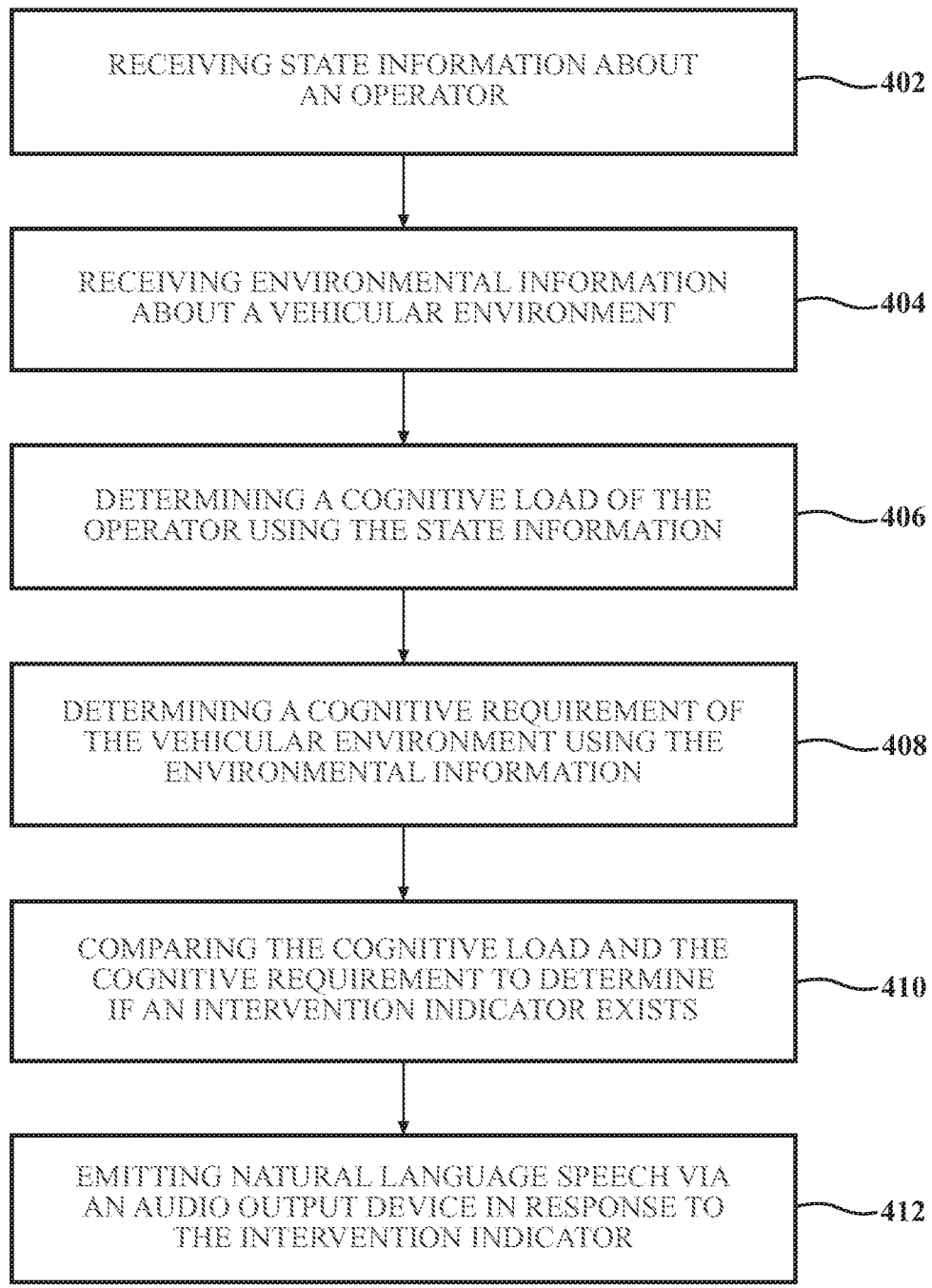
FIG. 4 is a flow diagram of a method for interacting with an operator in light of intervention indicator, according to embodiments described herein.

FIG. 4 is a flow diagram of method 400 for interacting with an operator, according to embodiments described herein. The method 400 described herein includes learning details about the personality of an operator, determining the cognitive load of the operator, the cognitive requirement of the environment and determining if cognitive load is low. If cognitive load is low for the environment, the method 400 includes natural language speech generation to create a conversation between the vehicle and the operator. The method 400 can optionally include receiving one or more personality inputs from the operator, the personality inputs being stored as personality profile information, at 402. The method 400 can further include receiving state information about an operator, at 404. Then, environmental information can be received about a vehicular environment, at 406. Then, a cognitive load of the operator can be determined using the state information, at 408. Then, cognitive requirement of the vehicular environment can be determined using the environmental information, at 410. The cognitive load and the cognitive requirement can then be compared to determine if an intervention indicator exists, at 412. Then, natural language speech can be emitted via an audio output device in response to the intervention indicator, at 414.

The method 400 can optionally begin by receiving one or more personality inputs from the operator, the personality inputs being stored as personality profile information, at 402. The method 400 can include acquiring personality profile information that characterizes the interests of the operator, the knowledge base of the operator, personality of the operator, and so on. In one embodiment, the personality inputs and the subsequent personality profile information is collected as part of a system, such as the personality profile module 220 of the vehicle companion system 170. The personality profile module 220 can receive input regarding the operator's personality, likes, needs and interests from a variety of sources, described with reference to FIG. 2. The personality inputs and the subsequent personality profile information can be substantially similar to said components, described with reference to FIG. 2. The personality profile information can be a collection of information regarding the operator's personality, likes, needs and interests, such as driving preferences, hobbies, personal interests, political interests, moods and emotional triggers, group involvements, planned events, social engagements, and others information which describes or influences the operator's personality. The personality profile information can be stored in a database, such as personality profile information 260 in the database 210, described with reference to FIG. 2. In another embodiment, the personality profile information can be derived from another source, such as from information given by the operator, from information derived the above system during previous engagement, or from information collected by a separate system capable of collecting information about the personality of the operator.

The method 400 can further include receiving, using one or more internal sensors, state information about an operator, at 404. The sensors can be sensors as described above with reference to FIGS. 1 and 2. In one embodiment, the sensors can include components of the sensor system 120 of the vehicle 100, such as the vehicle sensors 121, the environment sensors 122 and the operator sensors 127. The state information can provide information or guidance as to alertness aspects of the operator. Information which indicates the alertness of the driver can include information that characterizes a present mental state of the operator, a present cognitive load of the operator, anticipated cognitive load of the operator, biological responses/conditions of the operator, and so on. The state information can be stored as part of a database, such as the state information 270 stored in the database 210, described with reference to FIG. 2.

Then, environmental information can be received about a vehicular environment, using one or more external sensors, at 406. The environmental information about the vehicular environment can be received data relating to parameters of the environment. The environmental information is information which provides one or more indicators regarding the shape, spacing or nature of the environment around the vehicle or components (e.g., objects) therein. The environmental information can be stored as part of a database, such as the environmental information 290 stored in the database 210, described above with reference to FIG. 2.

Then, a cognitive load of the operator can be determined using the state information, at 408. The cognitive load of the operator is a measure of the level of mental work the operator is performing. The cognitive load can be measured using a variety of inputs, such as gaze, biometrics or others. The cognitive load can further include operator specific factors, such as change in load under certain driving situations (e.g., operator tends to get have decreased cognitive load during rain). In one embodiment, the cognitive load can be determined using the state information 270, described with reference to FIG. 2. The state information can be stored in a database, such as state information the database 210 described with reference to FIG. 2. The cognitive load can be substantially similar to the cognitive load described with reference to FIG. 2. The cognitive load of the operator can be determined as part of a system, such as by using the cognitive monitoring module 230 of the vehicle companion system 170, described with reference to FIG. 2. As noted above, the cognitive load can be either an actual cognitive load, as determined by direct measurement of values, or an anticipated cognitive load, as predicted based on known values, temporal measurement and environmental characteristics known to affect the operator.

As well, cognitive requirement of the vehicular environment can be determined using the environmental information, at 410. The cognitive requirements of the vehicle environment can include a measure of the attention, alertness, or awareness desirable from the operator for vehicle operation within an environment, such as the minimum vigilance for safe vehicle operation. In one example, the cognitive requirement can be determined by a system, such as by using the cognitive monitoring module 230 of the vehicle companion system 170, described with reference to FIG. 2. The vehicle companion system 170 apply information from the cognitive load model 280 to calculate, using information from the sensors, cognitive requirement from the operator for vehicle operation within an environment, such as the minimum vigilance for safe vehicle operation. The cognitive requirements of an environment can include challenge information about the vehicular environment. Challenge information about a vehicular environment is information related to the level of difficulty of a vehicular environment. In the instance of a system, the vehicle companion system 170 anticipates that the more challenging a driving environment is, the more an operator will have to concentrate (e.g., higher cognitive load). More concentration is interpreted by the vehicle companion system 170 as reducing the likelihood of falling asleep. Conversely, the less challenging an environment is, the less an operator will have to concentrate (e.g., lower cognitive load and higher likelihood of falling asleep). The cognitive requirement and the challenge information can be substantially similar to that described with reference to FIG. 2.

The cognitive load and the cognitive requirement can then be compared to determine if an intervention indicator exists, at 412. In embodiments where the cognitive requirement is a range of values, the cognitive load can be compared to the range to determine if the cognitive load falls outside of said range. In embodiments where the cognitive requirement is a specific value, the cognitive load can be compared to determine if the cognitive load is above, below or equal to said value. The cognitive requirement can be an inclusive value, such that any value of cognitive load less than or equal to the cognitive requirement is treated as low. The comparison of the cognitive load to the cognitive requirement can be performed as part of a system, such as by using the cognitive monitoring module 230 of the vehicle companion system 170, described with reference to FIG. 2. As part of the system, the cognitive monitoring module 230 can then determine if there is an intervention indicator, if the cognitive load is determined at or below an unacceptable cognitive load value.

Then, natural language speech can be emitted via an audio output device in response to the intervention indicator, at 414. The natural language speech can be emitted from a device, such as speakers which are in communication with a system. The natural language speech can prompt a conversation with the operator. The conversation can include a topic selected based on stored personality profile information. In one example, the conversation can be initiated based on a determination that the cognitive load has fallen below the cognitive requirement. The natural language speech is then emitted via the audio output device, to draw the operator into conversation. The personality profile information can include the likes and dislikes of the operator, such as an interest in local politics. Thus, the natural language speech can include said interest, such as an explanation of an ongoing mayoral race.

The natural language speech and interaction related to the stored personality profile information of the method 400 can be substantially similar to said elements described with reference to FIG. 2. Systems capable of performing the elements described here include the vehicle companion system 170, described with reference to FIG. 2. In this system, the conversation module 240 can access the database 210 for personality profile information 260. The conversation module 240 can then select a topic based on operator interest level and available recent information. The conversation module 240 can then reference information about the topic and emit natural language speech about said topic via an audio output device, such as the speakers 320 shown in FIG. 3.

Other and further embodiments of the methods and systems described above are contemplated, including combinations of or deletions from said methods, without specific recitation thereof. In one embodiment, the cognitive monitoring module further includes instructions that when executed by the one or more processors cause the one or more processors to receive environmental information using the one or more sensors, and to determine an anticipated intervention indicator, for the operator, using the environmental inputs. In another embodiment, the conversation module further includes instructions that when executed by the one or more processors cause the one or more processors to emit natural language speech via an audio output device in response to the anticipated intervention indicator, the natural language speech prompting a conversation with the operator, the conversation including a topic selected based on personality profile information. In another embodiment, intervention indicator is indicated by the cognitive load being outside of cognitive load range set by the cognitive requirement. In another embodiment, the cognitive load is an anticipated cognitive load. In another embodiment, the cognitive monitoring module further includes instructions to determine a second cognitive load after an operator response, and to compare the second cognitive load to the cognitive requirement to determine if an intervention indicator exists. In another embodiment, the cognitive monitoring module further includes instructions to compare the adjusted cognitive load to the cognitive load to determine a cognitive load change.

FIG. 1 will now be discussed in full detail as an example vehicle environment within which the system and methods disclosed herein may operate. In some instances, the vehicle 100 is configured to switch selectively between an autonomous mode, one or more semi-autonomous operational modes, and/or a manual mode. Such switching also referred to as handover when transitioning to a manual mode can be implemented in a suitable manner, now known or later developed. "Manual mode" means that all of or a majority of the navigation and/or maneuvering of the vehicle is performed according to inputs received from a user (e.g., human driver/operator).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver/operator. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (e.g., driver) provides inputs to the vehicle to perform a portion of the navigation and/or maneuvering of the vehicle 100 along a travel route. Thus, in one or more embodiments, the vehicle 100 operates autonomously according to a particular defined level of autonomy. For example, the vehicle 100 can operate according to the Society of Automotive Engineers (SAE) automated vehicle classifications 0-5. In one embodiment, the vehicle 100 operates according to SAE level 2, which provides for the autonomous driving module 160 controlling the vehicle 100 by braking, accelerating, and steering without operator input but the driver/operator is to monitor the driving and be vigilant and ready to intervene with controlling the vehicle 100 if the autonomous driving module 160 fails to properly respond or is otherwise unable to adequately control the vehicle 100.

The vehicle 100 can include a processor 110. In one or more arrangements, the processor 110 can be a main processor of the vehicle 100. In one example, the processor 110 can be an electronic control unit (ECU). Depending on the desired configuration, the processor 110 can be of any type for use in the data processing and analysis described herein. The processor 110 can be a microprocessor (μP), a microcontroller (μC), a digital signal processor (DSP), or any combination thereof. The processor 110 can be a set of one or more processors or can be a multi-processor core, depending on the particular implementation. Further, processor 110 can be one or more heterogeneous processor systems, in which a main processor is present with secondary processors on a single chip. In another example, the processor 110 can be a symmetric multi-processor system containing multiple processors of the same type. Further combinations or permutations of the processor 110 are contemplated without specific recitation herein.

The vehicle 100 can include a data store 115. The data store 115 is any piece of hardware that is capable of storing data or information. Examples of data or information which can be stored in the data store 115 include, without limitation, data, program code in functional form, and/or other suitable information either on a temporary basis and/or a permanent basis. The data store 115 can include one or more modules that include computer readable instructions that, when executed by the processor 110, cause the processor 110 to perform methods and functions that are discussed herein. The data store 115 can include volatile and/or non-volatile memory. An example of the data store 115 can include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor 110, or the data store 115 can be operably connected to the processor 110 for use thereby. The media used by data store 115 can be removable. For example, a removable hard drive can be used for data store 115. The term "operably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road surface markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. Sensor data 119 can include data from sensors of the sensor system 120 which are focused on the exterior of the vehicle 100 and sensors of the sensor system 120 which are focused on the interior of the vehicle 100. The sensor data 119 can relate to one or more sensors of the sensor system 120. In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component, system or combination thereof that can detect and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operably connected to the processor 110, the data store 115, and/or another element of the vehicle 100 (including any of the elements shown in FIG. 1). The sensor system 120 can acquire data of at least a portion of the external environment of the vehicle 100 (referred to herein as the "vehicular environment").

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100. As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras, infrared (IR) cameras and so on.

Alternatively, or in addition, the sensor system 120 can include one or more environment sensors 122 configured to acquire, and/or sense vehicular environment data. "Vehicular environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors 127 that function to track or otherwise monitor aspects related to the driver/operator of the vehicle 100. In one or more embodiments described herein, the operator sensors 127 can include one or more of the following: image capture devices (e.g., cameras 126), audio capture devices (e.g., microphones), biometric devices (e.g., blood pressure monitors), and others. However, it will be understood that the embodiments are not limited to the particular sensors described. In one embodiment, the cameras 126 include one or more cameras disposed within a passenger compartment of the vehicle for performing eye-tracking on the operator/driver in order to determine a gaze of the operator/driver, an eye track of the operator/driver, and so on.

The vehicle 100 can include an input system 130. An "input system" includes any device, component, system, element or arrangement or groups thereof that enable information/data to be entered into a machine. The input system 130 can receive an input from a vehicle occupant (e.g. the operator or a passenger). The vehicle 100 can include an output system 135. An "output system" includes any device, component, or arrangement or groups thereof that enable information/data to be presented to a vehicle occupant (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, sensors, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor 110 and/or the autonomous driving module(s) 160 can be operably connected to communicate with the various embodiments of the vehicle systems 140 and/or individual components thereof. For example, the processor 110 and/or the autonomous driving module(s) 160 can be in communication to send and/or receive information from the various embodiments of the vehicle systems 140 to control the movement, speed, maneuvering, heading, direction, etc. of the vehicle 100. The processor 110 and/or the autonomous driving module(s) 160 may control some or all of these vehicle systems 140 and, thus, may be partially or fully autonomous.

The processor 110 and/or the autonomous driving module(s) 160 may be operable to control the navigation and/or maneuvering of the vehicle 100 by controlling one or more of the vehicle systems 140 and/or components thereof. For instance, when operating in an autonomous mode, the processor 110 and/or the autonomous driving module(s) 160 can control the direction and/or speed of the vehicle 100. The processor 110 and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels).

The vehicle 100 can include one or more actuators 150. The actuators 150 can be any element or combination of elements operable to modify, adjust and/or alter one or more of the vehicle systems 140 or components thereof to responsive to receiving signals or other inputs from the processor 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor 110, or one or more of the modules can be executed on and/or distributed among other processing systems to which the processor 110 is operably connected. The modules can include instructions (e.g., program logic) executable by one or more processor 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the vehicle companion system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140). In some embodiments, the vehicle companion system 170 can be configured to control the vehicle 100 through the autonomous driving module(s) 160, such as if the operator is determined to be non-responsive.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible embodiments of systems, methods and computer program products according to various embodiments. In this regard, each block in the flowcharts or block diagrams can represent a module, segment, or portion of code, which comprises one or more executable instructions for implementing the specified logical function(s). It should also be noted that, in some alternative embodiments, the functions noted in the block can occur out of the order noted in the Figures. For example, two blocks shown in succession can, in fact, be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the embodiment of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by or in connection with an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

While the foregoing is directed to embodiments of the disclosed devices, systems, and methods, other and further embodiments of the disclosed devices, systems, and methods can be devised without departing from the basic scope thereof. The scope thereof is determined by the claims that follow.

What is claimed is:

1. A vehicle companion system for vehicle-to-user interaction, comprising:

one or more processors; and
a memory communicably coupled to the one or more processors and storing:
a cognitive monitoring module including instructions that when executed by the one or more processors cause the one or more processors to receive, using one or more internal sensors, state information about an operator, to receive, using one or more external sensors, environmental information about a vehicular environment, to determine a cognitive load of the operator using the state information, the cognitive load being a measure of the mental effort being exerted by the operator, to determine a cognitive requirement of the vehicular environment using the environmental information, the cognitive requirement being a measure of the attention, alertness, or awareness desired from the operator for vehicle operation within an environment, to compare the cognitive load and the cognitive requirement to determine if an intervention indicator exists, and to determine whether there is an anticipated intervention indicator, for the operator, using the environmental information; and
a conversation module including instructions that when executed by the one or more processors cause the one or more processors to emit natural language speech via an audio output device in response to the intervention indicator or the anticipated intervention indicator, the natural language speech prompting a conversation with the operator, the conversation including a topic selected based on stored personality profile information.

2. The vehicle companion system of claim 1, further comprising a personality profile module including instructions that when executed by the one or more processors cause the one or more processors to receive one or more personality inputs from the operator, and to store the one or more personality inputs as personality profile information in a database.

3. The vehicle companion system of claim 1, wherein the intervention indicator is indicated by the cognitive load being outside of a cognitive load range set by the cognitive requirement.

4. The vehicle companion system of claim 1, wherein the cognitive load is an anticipated cognitive load.

5. The vehicle companion system of claim 1, wherein the cognitive monitoring module further includes instructions to determine a second cognitive load after an operator response, and to compare the second cognitive load to the cognitive requirement to determine if the intervention indicator exists.

6. The vehicle companion system of claim 5, wherein the cognitive monitoring module further includes instructions to compare an adjusted cognitive load to the cognitive load to determine a cognitive load change.

7. A non-transitory computer-readable medium for vehicle-to-user interaction and storing instructions that when executed by one or more processors cause the one or more processors to:
receive, using one or more internal sensors, state information about an operator;
receive, using one or more external sensors, environmental information about a vehicular environment;
determine a cognitive load of the operator using the state information, the cognitive load being a measure of the mental effort being exerted by the operator;
determine a cognitive requirement of the vehicular environment using the environmental information, the cognitive requirement being a measure of the attention, alertness, or awareness desired from the operator for vehicle operation within an environment;
compare the cognitive load and the cognitive requirement to determine if an intervention indicator exists;
determine whether there is an anticipated intervention indicator, for the operator, using the environmental information; and
emit natural language speech via an audio output device in response to the intervention indicator or the anticipated intervention indicator, the natural language speech prompting a conversation with the operator, the conversation including a topic selected based on stored personality profile information.

8. The non-transitory computer-readable medium of claim 7, further including instructions to receive one or more personality inputs from the operator, and to store the one or more personality inputs as personality profile information in a database.

9. The non-transitory computer-readable medium of claim 7, wherein the cognitive load is an anticipated cognitive load.

10. The non-transitory computer-readable medium of claim 7, further including instructions to determine a second cognitive load after an operator response, to compare the second cognitive load to the cognitive requirement to determine if the intervention indicator exists, and to compare an adjusted cognitive load to the cognitive load to determine a cognitive load change.

11. A method for vehicle-to-user interaction, comprising:
receiving, using one or more internal sensors, state information about an operator;
receiving, using one or more external sensors, environmental information about a vehicular environment;
determining a cognitive load of the operator using the state information, the cognitive load being a measure of the mental effort being exerted by the operator;
determining a cognitive requirement of the vehicular environment using the environmental information, the cognitive requirement being a measure of the attention, alertness, or awareness desired from the operator for vehicle operation within an environment;
comparing the cognitive load and the cognitive requirement to determine if an intervention indicator exists;
determining whether there is an anticipated intervention indicator, for the operator, using the environmental information; and
emitting natural language speech via an audio output device in response to the intervention indicator or the anticipated intervention indicator, the natural language speech prompting a conversation with the operator, the conversation including a topic selected based on stored personality profile information.

12. The method of claim 11, further comprising receiving one or more personality inputs from the operator, and storing the one or more personality inputs as personality profile information in a database.

13. The method of claim 11, wherein the cognitive load is an anticipated cognitive load.

14. The method of claim 11, further including instructions to determine a second cognitive load after an operator response, to compare the second cognitive load to the cognitive requirement to determine if the intervention indicator exists, and to compare an adjusted cognitive load to the cognitive load to determine a cognitive load change.

* * * * *